United States Patent
Fang et al.

(10) Patent No.: US 12,326,843 B2
(45) Date of Patent: Jun. 10, 2025

(54) DATA PROCESSING METHOD, AND NON-TRANSITORY MEDIUM AND ELECTRONIC DEVICE

(71) Applicant: Lemon Inc., Grand Cayman (KY)

(72) Inventors: Chenliaohui Fang, Beijing (CN); Junyuan Xie, Beijing (CN); Lele Yu, Beijing (CN); Xiaobing Liu, Los Angeles, CA (US); Di Wu, Beijing (CN)

(73) Assignee: Lemon Inc., Grand Cayman (KY)

( * ) Notice: Subject to any disclaimer, the term of this patent is extended or adjusted under 35 U.S.C. 154(b) by 209 days.

(21) Appl. No.: 18/252,926

(22) PCT Filed: Nov. 6, 2021

(86) PCT No.: PCT/SG2021/050679
§ 371 (c)(1),
(2) Date: May 15, 2023

(87) PCT Pub. No.: WO2022/108520
PCT Pub. Date: May 27, 2022

(65) Prior Publication Data
US 2023/0418794 A1 Dec. 28, 2023

(30) Foreign Application Priority Data
Nov. 19, 2020 (CN) .......................... 202011308389.8

(51) Int. Cl.
*G06F 16/21* (2019.01)
*G06F 16/215* (2019.01)
*G06F 21/60* (2013.01)

(52) U.S. Cl.
CPC .......... *G06F 16/215* (2019.01); *G06F 21/602* (2013.01)

(58) Field of Classification Search
CPC ................. G06F 16/215; G06F 21/602; G06F 16/24568; G06F 16/2477
See application file for complete search history.

(56) References Cited

U.S. PATENT DOCUMENTS 11,507,556 B2   11/2022   Coker
2012/0290631 A1   11/2012   Grube et al.
(Continued)

FOREIGN PATENT DOCUMENTS

| CN | 104426646 A | 3/2015 |
| CN | 107251475 A | 10/2017 |

(Continued)

OTHER PUBLICATIONS

China National Intellectual Property Administration, Office Action and Search Report Issued in Application No. 202011308389.8, Aug. 31, 2023, 4 pages.
(Continued)

*Primary Examiner* — Izunna Okeke
(74) *Attorney, Agent, or Firm* — Alleman Hall & Tuttle LLP

(57) ABSTRACT

The present disclosure relates to a data processing method, non-transitory medium and electronic device. The method includes: acquiring first user data and second user data, and initializing a first time window corresponding to the first user data and first time information corresponding to the first time window, as well as a second time window corresponding to the second user data and second time information corresponding to the second time window; determining first data and the first time information corresponding to the first time window based on the first user data; determining second data and the second time information corresponding to the second time window based on the second user data; based on the first data and the second data, determining (Continued)

alignment data corresponding to a same user from the first user data and the second user data.

14 Claims, 4 Drawing Sheets

(56) References Cited

U.S. PATENT DOCUMENTS

| | | | |
|---|---|---|---|
| 2019/0013950 | A1 | 1/2019 | Becker et al. |
| 2020/0210430 | A1* | 7/2020 | Shen ............... G06F 16/221 |
| 2020/0311136 | A1* | 10/2020 | Jun ............... G06N 3/045 |

FOREIGN PATENT DOCUMENTS

| | | |
|---|---|---|
| CN | 108540459 A | 9/2018 |
| CN | 109698806 A | 4/2019 |
| CN | 109756744 A | 5/2019 |
| CN | 109978055 A | 7/2019 |
| CN | 110209726 A | 9/2019 |
| CN | 110674125 A | 1/2020 |
| CN | 111095332 A | 5/2020 |
| CN | 111178538 A | 5/2020 |
| CN | 111504676 A | 8/2020 |
| CN | 111860865 A | 10/2020 |
| CN | 111931253 A | 11/2020 |
| CN | 111931323 A | 11/2020 |
| CN | 111936985 A | 11/2020 |

OTHER PUBLICATIONS

ISA Intellectual Property Office of Singapore, International Search Report Issued in Application No. PCT/SG2021/050679, Jan. 26, 2022, WIPO, 7 pages.

ISA Intellectual Property Office of Singapore, Written Opinion for International Application No. PCT/SG2021/050679, mailed Jan. 26, 2022, 18 Pages.

* cited by examiner

DATA PROCESSING METHOD, AND NON-TRANSITORY MEDIUM AND ELECTRONIC DEVICE

CROSS-REFERENCE TO RELATED APPLICATIONS

The present disclosure is a U.S. National Stage Application under 35 U.S.C. § 371 of International Patent Application No. PCT/SG2021/050679, filed on Nov. 6, 2021, which is based on and claims the benefit of priority to the Chinese patent application No. 202011308389.8 filed on Nov. 19, 2020, which is hereby incorporated by reference in its entirety into the present disclosure.

TECHNICAL FIELD

This disclosure relates to the field of computer technology, in particular to a data processing method, device, medium, and electronic device.

BACKGROUND

With the development of artificial intelligence technology, machine learning has gained more and more applications. In recent years, in order to protect data security and solve the problem of data silos, joint training models have been commonly used to achieve joint training of machine learning models without exposing the original data. In the scenario of vertical federated learning, a key issue is how to concatenate the features of different parties that participate a federated learning (FL) process into complete samples for use by the trainer.

In related technologies, different parties involved in a federated learning process usually store their data status using stable DFSs (distributed file system) or OSSs (object storage system) and relational databases for data alignment. These parties generate their own data irregularly and continuously add their data to a federated learning system to determine data corresponding to the same user. The above process is less efficient in determining user data that are generated in batches.

SUMMARY

This summary is provided for a concise introduction of the inventive concept of the present disclosure, which will be described in detail in the detailed description below. This summary is not intended to identify critical features or essential features of the claimed technical solution, nor is it intended to be used to limit the scope of the claimed technical solution.

In a first aspect, the present disclosure provides a data processing method, comprising: acquiring first user data and second user data, and initializing a first time window corresponding to the first user data and first time information corresponding to the first time window, as well as a second time window corresponding to the second user data and second time information corresponding to the second time window; determining first data and the first time information corresponding to the first time window based on the first user data; determining second data and the second time information corresponding to the second time window based on the second user data; determining alignment data corresponding to the same user from the first user data and the second user data based on the first data and the second data.

In a second aspect, there is provided a data processing apparatus, comprising: an acquisition module for acquiring first user data and second user data, and initializing a first time window corresponding to the first user data and first time information corresponding to the first time window, as well as a second time window corresponding to the second user data and second time information corresponding to the second time window; a first determination module for determining first data and the first time information corresponding to the first time window based on the first user data; a second determination module for determining second data and the second time information corresponding to the second time window based on the second user data; a third determination module for determining alignment data corresponding to a same user from the first user data and the second user data based on the first data and the second data.

In a third aspect, there is provided a computer-readable storage medium having stored thereon a computer program that, when executed by a processing device, implements the steps of the data processing method described in the first aspect.

In a fourth aspect, there is provided an electronic device, comprising: a storage device having stored thereon a computer program; a processing device for executing the computer program in the storage device to implement the steps of the data processing method described in the first aspect.

In the above technical solution, first user data and second user data are obtained, and a first time window corresponding to the first user data and first time information corresponding to the first time window, as well as a second time window corresponding to the second user data and second time information corresponding to the second time window, are initialized, so that first data and the first time information corresponding to the first time window can be determined based on the first user data, and second data and the second time information corresponding to the second time window can be determined based on the second user data. Then, alignment data corresponding to the same user can be determined from the first user data and the second user data based on the first data and the second data. Therefore, through the above technical solution, when two federated learning parties generate sample data irregularly, the generated sample data can be locally aligned by means of time windows, thereby improving the efficiency of data processing and ensuring the accuracy of streaming data processing. In addition, this method can be applied to data alignment processing of user data generated in batches, which can expand the application scope of the data processing method while improving the data processing efficiency, ensuring the acquisition of accurate federated learning sample data and improving user experience.

Other features and advantages of this disclosure will be explained in detail in the subsequent specific embodiments.

BRIEF DESCRIPTION OF THE DRAWINGS

The above and other features, advantages, and aspects of the embodiments of the present disclosure will become more apparent from the following embodiments with reference to the drawings. Throughout the drawings, the same or similar reference signs indicate the same or similar elements. It should be understood that the drawings are schematic and the components and elements are not necessarily drawn to scale. In the drawings.

DETAILED DESCRIPTION

Exemplary embodiments of the present disclosure will now be described in detail with reference to the accompanying drawings. Although some embodiments of the present disclosure are shown, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the methods of the embodiments of the present disclosure may be executed in a different order, and/or executed in parallel. In addition, the methods may include additional steps and/or some of the illustrated steps may be omitted. The scope of this disclosure is not limited in this regard.

The term "including" and its variants as used herein is an open-ended mode expression, that is, "including but not limited to". The term "based on" means "based at least in part on". The term "one embodiment" means "at least one embodiment"; The term "another embodiment" means "at least one additional embodiment"; The term "some embodiments" means "at least some embodiments". Related definitions of other terms will be given in the following description.

It should be noted that the concepts of "first" and "second" mentioned in the present disclosure are only used to distinguish different devices, modules or units, and are not used to limit the order of functions performed by these devices, modules or units, or interdependence therebetween.

It should be noted that the modifications of "a" and "a plurality of" mentioned in the present disclosure are illustrative and not restrictive, and those skilled in the art should understand that unless clearly indicated in the context, they should be understood as "one or more".

The names of messages or information exchanged between multiple devices in the embodiments of the present disclosure are only used for illustrative purposes, and are not used to limit the scope of these messages or information.

Figure 1:
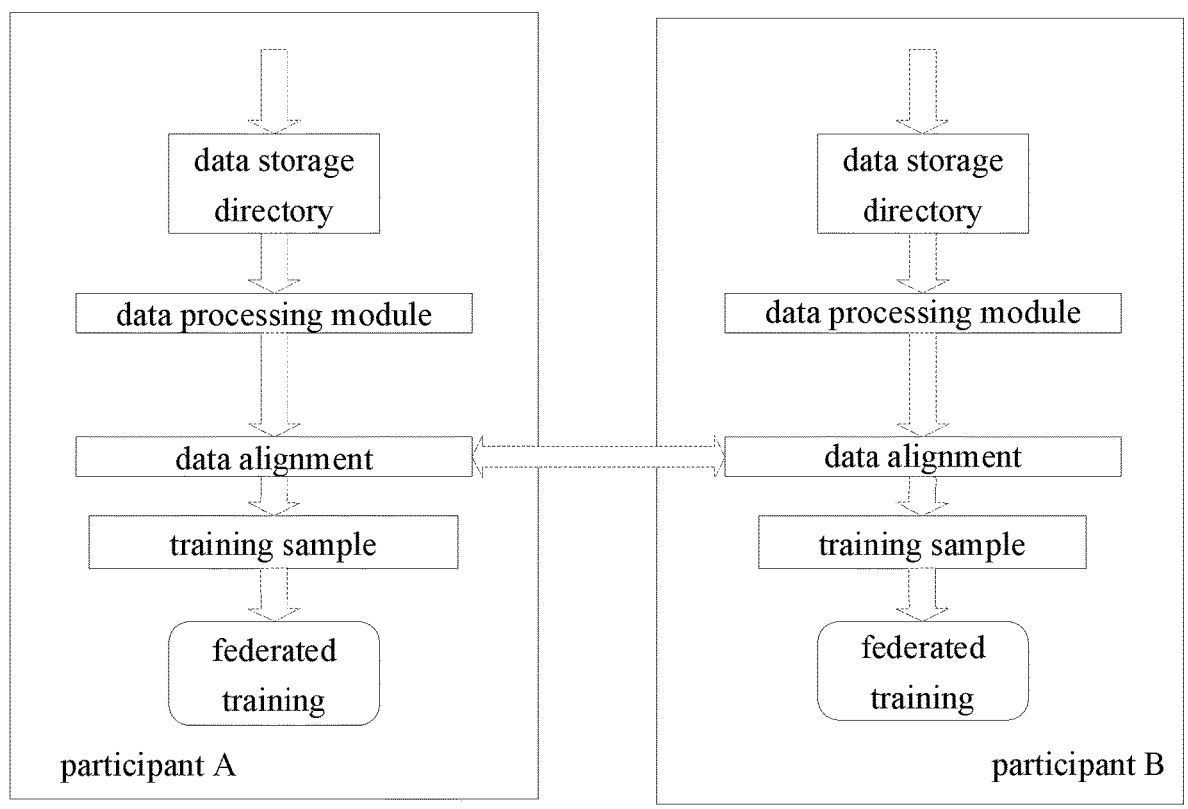
FIG. 1 is a schematic diagram of constructing a federated learning model.

As mentioned in Background, in the scenario of vertical federated learning, a key issue is how to concatenate the features of different parties that participate a federated learning process into complete samples for use by the trainer. In vertical federated learning, datasets used for training may contain many overlapping users, but fewer overlapping user features. Therefore, it is necessary to segment the datasets vertically (i.e., in the feature dimension) and generate training samples for federated training from data containing the same users but not exactly the same user features. In vertical federated learning, the data of federated learning participants is usually streaming data, which generally refers to data generated by the same online traffic. For example, in the adverting scenario, once a user clicks on an advertisement, a data record may be generated on the media platform side and the advertiser side, respectively. If the above two participants A and B participate in a federated learning process, these two data records need to be aligned to create a sample. Thus, in order to determine the sample, it is necessary to first determine data records corresponding to the same user among the data of the two participants. As shown in FIG. 1, participant A and participant B can respectively upload their respective data records to their corresponding data storage directories. Then, each participant's data is further stored in a corresponding data processing module, and a federated learning framework is entered into. The data processing module processes the data for data alignment, enabling the two participants to exchange identification information used for data alignment, so that data corresponding to the same user can be determined among the data of the participants. Then, training samples can be generated, and a federated model can be trained on each side based on the training samples to obtain a target federated learning model through joint training of the participants.

However, in the streaming data scenario, it is difficult to ensure that the storage time and the data storage reliability of the generated data records are consistent among the participants, such as missing data records and inconsistent storage order of data records. Moreover, different federated learning parties generate their own data irregularly and continuously add their data to the federated learning system for data alignment. Therefore, for the above data, the efficiency of data alignment in the related technology is relatively low. In view of this, the present disclosure provides the following embodiments.

Figure 2:
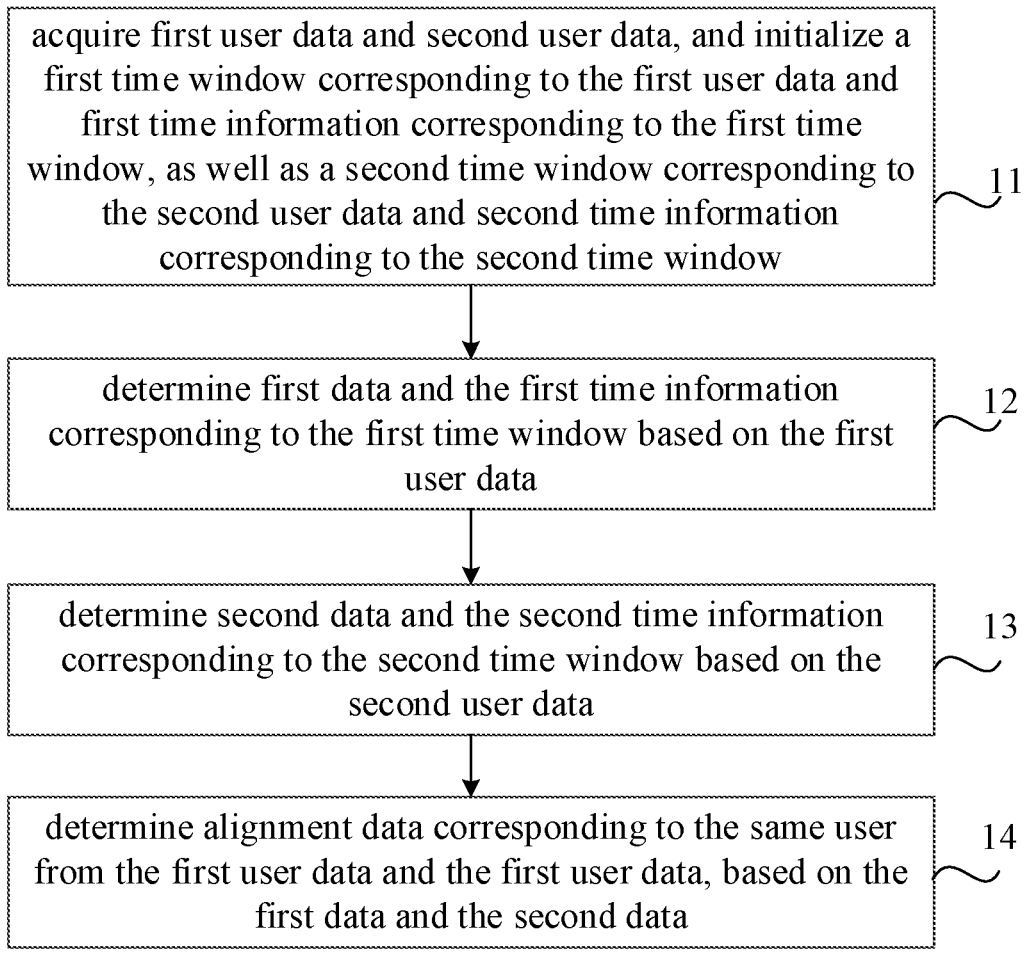
FIG. 2 is a flowchart of a data processing method provided according to some embodiments of the present disclosure.
Figure 3:
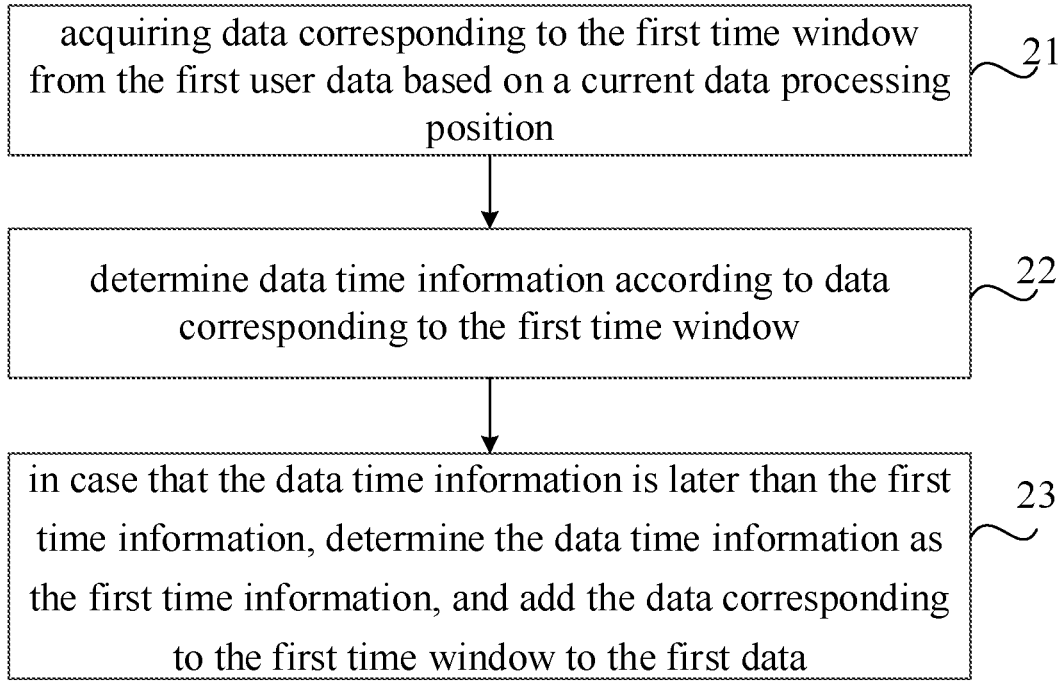
FIG. 3 is a flowchart of an exemplary method for determining first data corresponding to a first time window and first time information based on first user data provided according to some embodiments of the present disclosure.

FIG. 2 shows a flowchart of a data processing method provided according to some embodiments of the present disclosure. As shown in FIG. 2, the method comprises the following steps.

In step 11, first user data and second user data are acquired, and a first time window corresponding to the first user data and first time information corresponding to the first time window, as well as a second time window corresponding to the second user data and second time information corresponding to the second time window are initialized.

The first user data and the second user data are data of two parties involved in federated learning. For example, in some embodiments of the present disclosure, the two federated learning parties are parties that need to perform streaming data processing. Therefore, in some embodiments of the present disclosure, alignment can be performed on locally ordered data based on time windows, allowing for batch data alignment processing. The first time window and the second time window can be initialized to the same length, which can be set according to actual application scenarios and is not specifically limited in this disclosure. The first time information is used to represent the time corresponding to the overall data in the first time window, and the second time information is used to represent the time corresponding to the overall data in the second time window. As an example, the first and second time information can be initialized to zero.

It should be understood that the term 'two parties' is used here for ease of understanding, and federated learning can be extended to scenarios involving more parties.

In step 12, first data and the first time information corresponding to the first time window are determined based on the first user data. In this step, data corresponding to the first time window is read from the first user data, so that the corresponding first time information can be determined based on this data.

In step 13, second data and the second time information corresponding to the second time window are determined based on the second user data. Similarly, in this step, data corresponding to the second time window is read from the second user data, so that the corresponding second time information can be determined based on this data.

In step 14, based on the first data and the second data, alignment data corresponding to the same user is determined from the first user data and the second user data.

After determining the first data and the second data in this step, data alignment can be performed based on identification information in the first data and the second data. The identification information is used to uniquely represent a data record. For example, the identification information is the same primary key corresponding to the data records in the first data and the second data. For example, for identification information of each data element in the first data, it is determined whether the identification information exists in the second data. If so, it means that the data element corresponding to the identification information in the first data and the data element corresponding to the identification information in the second data are data elements corresponding to the same user. In this case, these data elements can be separately extracted as alignment data, and then can be concatenated to obtain training data for vertical federated learning.

In the above technical solution, first user data and second user data are obtained, and a first time window corresponding to the first user data and first time information corresponding to the first time window, as well as a second time window corresponding to the second user data and second time information corresponding to the second time window, are initialized, so that first data and the first time information corresponding to the first time window can be determined based on the first user data, and second data and the second time information corresponding to the second time window can be determined based on the second user data. Then, alignment data corresponding to the same user can be determined from the first user data and the second user data based on the first data and the second data. Therefore, through the above technical solution, when two federated learning parties generate sample data irregularly, the generated sample data can be locally aligned by means of time windows, thereby improving the efficiency of data processing and ensuring the accuracy of streaming data processing. In addition, this method can be applied to data alignment processing of user data generated in batches, which can expand the application scope of the data processing method while improving the data processing efficiency, ensuring the acquisition of accurate federated learning sample data and improving user experience.

In some embodiments, the step of determining second data and the second time information corresponding to the second time window based on the second user data comprises: in the case where the second time information is earlier than or equal to the first time information, determining second data and the second time information corresponding to the second time window based on the second user data.

In streaming data processing, user data is in general locally ordered, so the time information of the two communication parties for data alignment is usually aligned. Therefore, in some embodiments, if the second time information is later than the first time information, the time information of the data in a second time window determined later is usually later than the second time information. At that point, the overall data in the first time window corresponding to the first time information corresponds to an earlier time, and the possibility for matching with the data in the second time window determined later is relatively small. Thus, in some embodiments of this disclosure, if the second time information is earlier than or equal to the first time information, alignment processing is performed on the data of the current communication parties within the time windows, which can not only improve the possibility that the first data matches the second data identified, but also avoid unnecessary data matching processing, thereby further improving the efficiency of data processing.

In some embodiments, the step of determining first data and the first time information corresponding to the first time window based on the first user data comprises the following steps.

In step 21, based on a current data processing position, data corresponding to the first time window is obtained from the first user data. The current data processing position is initially the starting position of the first user data. Data can be read from a queue of the first user data according to the length of the first time window. Then, the current data processing position can be updated based on the progress of data reading, i.e., it is used to record the starting position of the data to be read from the first user data.

In step 22, data time information is determined based on the data corresponding to the first time window.

Timestamp information of the M-th data element in the first time window can be used as the data time information. For example, the value of M can be pre-specified, or can be determined based on the length of the first time window. For example, M can be set to a positional percentage P within the first time window. For example, if P is 10%, and if the length of the first time window is 100 (it contains 100 data elements), M is 10, that is, the timestamp information of the 10th data is determine as the first time information. If the length of the first time window is 200, M is 20, that is, the timestamp information of the 20th data is used as the first time information.

In step 23, if the data time information is later than the first time information, the data time information is used as the first time information, and the data corresponding to the first time window is added to the first data.

The data time information is later than the first time information, that is, when the data corresponding to the first time window is read, the time corresponding to this part of data is moved back as a whole, that is, the data in the first time window is locally ordered. In this situation, this part of data determined can be added to the first data, i.e., it can be treated as the first data, and the first time information can be obtained as described above, to characterize that the user data in the first time window is locally ordered. Therefore, through the above technical solution, first data that is locally effect can be determined by comparing the data time information and the first time information during the data reading process, which can provide accurate data support for subsequent data alignment.

In some embodiments, the step of determining first data and the first time information corresponding to the first time window based on the first user data further comprises: in the case where the data time information is earlier than or equal to the first time information, and the first time window is shorter than a preset time window, increasing the first time window by a preset proportion, and returning to the obtaining the data corresponding to the first time window from the first user data based on the current data processing position, until the data time information is later than the first time information.

The length of the preset time window can be set according to actual application scenarios, and is not specifically limited in this disclosure. In some embodiments, when the data time information is earlier than or equal to the first time information, it means that a new part of data has been read from the first user data at that point, but the first time information corresponding to the data in the first time window has not been moved back, indicating that the data in the first time window is not locally ordered at that point. Thus, the length of the first time window can be increased, which means that a further part of data can be read from the first user data, thereby ensuring to some extent that the data in the first time window is locally ordered. For example, the preset proportion can be set according to actual application scenarios, for example, it can be set to 2, thereby the process can return to the step of obtaining data corresponding to the first time window from the first user data based on the current data processing position, to obtain more data from the first user data, and then determine the first data.

Therefore, through the above technical solution, more data can be obtained from the first user data by increasing the first time window to ensure the orderliness of the determined data to a certain extent. Therefore, by comparing the data time information with the first time information during the data reading process, first data that is locally effect can be determined, thereby providing accurate data support for subsequent data alignment, and improving the efficiency of data processing.

Similarly, the exemplary method of determining the second data and the second time information corresponding to the second time window based on the second user data is the same as the specific method of determining the first data and the first time information corresponding to the first time window based on the first user data described above, which will not be repeated here.

In some embodiments, after determining alignment data corresponding to the same user from the first user data and the second user data based on the first data and the second data, the method further comprises: storing data of the second data with timestamp information later than the first time information, and returning to the step of determining the first data and the first time information corresponding to the first time window based on the first user data, until all the data in the first user data or the second user data have been processed.

The data of the second data with timestamp information later than the first time information may match with the data of the first user data that is in a next time window. Therefore, in some embodiments, this part of the second data can be stored, so that it can be added in the data in the next time window redetermined for the second user data. This can ensure the accuracy of data alignment when data elements corresponding to the same user are divided into different time window data, thereby ensuring the efficiency of data alignment and the accuracy of data processing. Therefore, more comprehensive training data can be provided for a federated learning process, thus improving the federated learning modeling efficiency.

In actual application scenarios, not all data generated during business processing is valid data for federated learning. Therefore, the following embodiments are also provided in this disclosure.

In some embodiments, the first user data and the second user data are obtained by: on a side of a first provider providing the first user data, verifying features to be verified in first raw data of the first provider according to a predetermined feature verification rule, and identifying the first raw data verified as the first user data; on a side of a second provider providing the second user data, verifying features to be verified in second raw data of the second provider according to a predetermined feature verification rule, and identifying the second raw data verified as the second user data.

The first raw data and the second raw data are sample data actually produced by the two federated learning partners, i.e., the first provider and the second provider.

The predetermined feature verification rule can be set according to actual application scenarios. For example, a feature verification rule is set as follows:

```
feature {
  name: "age"
  value_count {
    min: 1
    max: 1
  }
  type: INT
  int_domain {
    min: 0
    max: 200
  }
}.
```

This feature verification rule indicates that there is be a feature named "age" in the original data, with a data type of INT and a corresponding value range of [0, 200]. If some of the raw data uploaded by a user does not have this "age" feature, or its type is not INT, or its value is outside the range [0, 200], the data cannot pass verification and will be filtered out; if the raw data includes an "age" feature and its data type is INT and its value is within the range [0, 200], the raw data can pass verification. It should be noted that the above is for illustrative purposes only and is not intended to limit this disclosure.

Therefore, through the above technical solution, feature verification can be performed on the raw data of the data provider, to preliminarily filter the original features based on the features in the raw data. This can effectively improve the effectiveness and accuracy of the alignment data that is determined subsequently, and avoid resource waste caused by aligning such data, thereby further improving the efficiency of data processing.

In some embodiments, in order to further improve the efficiency of data processing, the original data can be partitioned based on the identification information of the original data, thereby enabling concurrent processing of the data in each partition. In addition, the data in a partition can be preliminarily sorted according to timestamp information, to ensure the orderliness of the data in the partition, thereby improving the concurrency and processing efficiency of data processing.

In some actual application scenarios, as mentioned above, identification information can be used to uniquely represent a data record, so that data corresponding to the same user in participants' data can be identified based on consistent identification information. However, in the application scenarios of federated learning, in order to protect the privacy of user data, some identification information in the raw data cannot be directly exchanged for data alignment. For example, the identification information includes user identity information, user identification information, etc., which usually cannot be directly exchanged. In view of this, the present disclosure provides the following embodiments.

In some embodiments, in the first raw data of the first provider providing the first user data and the second raw data of the second provider providing the second user data, if the identification information used for data alignment processing is of a target type, the first user data and the second user data are obtained by: on the side of the first provider providing the first user data, performing offline encryption hash processing on the identification information of the first raw data based on a first cryptographic key to obtain the first user data; on the side of the second provider providing the second user data, noise is added to the identification information of the second raw data based on a second cryptographic key and noise information to obtain noise-added data, which is then sent to the first provider. After receiving encrypted data obtained by encrypting the noise-added data based on the first cryptographic key from the first provider, denoising is performed on the encrypted data based on the noise information. The denoised data is hashed to obtain the second user data, wherein the first cryptographic key correspond to a private key and the second cryptographic key correspond to a public key used in asymmetric encryption, respectively.

The target type of identification information is a type of identification information that cannot be directly exchanged, which can be specified by a user in advance for effective privacy protection. For example, offline encryption processing can be performed on the identification information of the first raw data and the identification information of the second raw data in the following encryption methods, respectively.

For example, the first provider providing the first user data, as the Leader, have an RSA private key, and the second provider providing the second user data, as the follower, have an RSA public key, and the identification information used for data alignment is the primary key id. Wherein the RSA private key and the RSA public key can be generated by the Leader, wherein the private key is d and the public key is (e, N), which has the following mathematical properties: for any n that is mutually prime with N, $n^{e*d}\% N = n\% N$ is held.

Concerning the Leader and the Follower, on the Leader side: firstly, the plaintext of the primary key id can be hashed using sha256 to form a number $X_1$ for subsequent calculation and processing; then, offline encryption hashing is performed on the identification information of the first raw data, that is, the plaintext of the primary key id is signed with the private key of the Leader through the calculation $X_1^d\% N$, and then is hashed by Hash($X_1^d\% N$), so that the signature result is hashed into a space by hash processing to obtain an encrypted primary key that can be used for exchanging to obtain the first user data, wherein the first user data includes at least the encrypted primary key and also include other data that can be exchanged.

On the Follower side: the plaintext of the primary key id is hashed into a number Xf using sha256; based on the second cryptographic key and noise information, the identification information of the second raw data is subjected to a noise addition process to obtain noise-added data, which is then sent to the first provider. For example, a random noise r can be generated through Xf as the noise information.

Then, the identification information of the second raw data is encrypted with salt based on this noise information, and noise-added data K is calculated using the public key, which is then sent to the Leader side:

$$K = (Xf * r^e)\% N$$

Due to the lack of the value of the noise information on the Leader side, it is not possible for the Leader side to infer Xf Encrypted data Q is calculated on the Lead side based on the public key and the private key, and is sent to the Follower side:

$$Q = (Xf * r^e)^d \% N = (Xf^d * r^{ed})\% N = (Xf^d * r)\% N$$

The encrypted data Q, i.e., $(Xf^d * r)\% N$ is received by the Follower side, and $Xf^d\% N$ can be calculated based on its noise information r for salting processing; then, through a hashing process: Hash($Xf^d\% N$), the result of decryption with salt is hashed into a space for hashing to obtain the encrypted primary key used for exchanging and obtaining the second user data.

Therefore, through the above process, finally, for the same primary key id, both the Follower and Leader get the same hashed value. The primary key id exchanged by the Follower is also encrypted with salt, and cannot be inferred by the Leader.

Therefore, through the above technical solution, it is possible to encrypt identification information that cannot be directly used for exchange, which not only ensure the accuracy of data alignment based on the identification information, but also protect data privacy and improve user experience. In addition, during the above process, preprocessing can be done offline, which can further improve the efficiency of data processing. Moreover, different random noise values can be used as a salt in the above process, further increasing data security.

In some embodiments, the first provider and the second provider verify their respective data based on the feature verification process described above, and perform the encryption process based on the verified data, which not only ensure the accuracy of the first user data and the second user data, but also protect the data privacy of the first user data and the second user data, further improving user experience.

Figure 4:
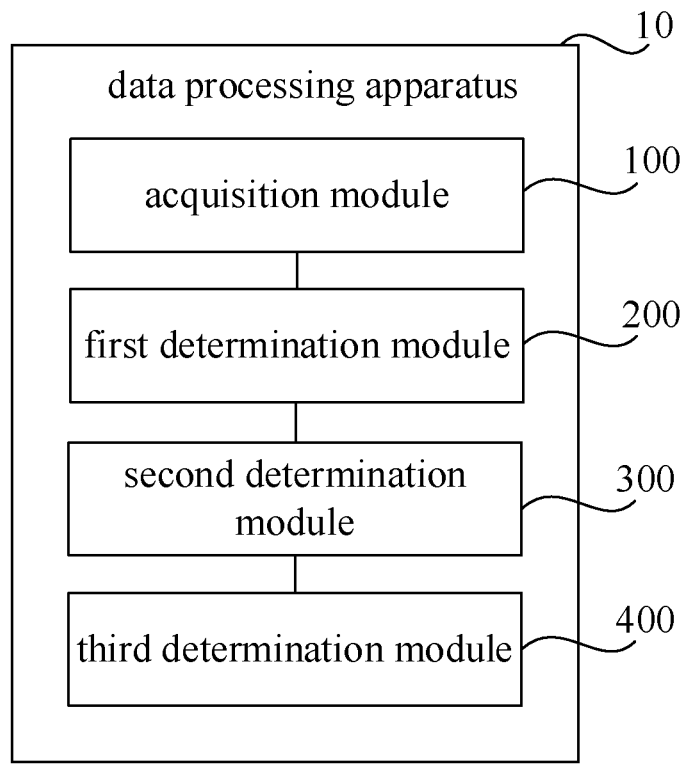
FIG. 4 is a block diagram of a data processing device provided according to some embodiments of the present disclosure.

The present disclosure also provides a data processing apparatus, as shown in FIG. 4, wherein the apparatus 10 comprises: an acquisition module 100 for acquiring first user data and second user data, and initializing a first time window corresponding to the first user data and first time information corresponding to the first time window, as well as a second time window corresponding to the second user data and second time information corresponding to the second time window; a first determination module 200 for determining first data and the first time information corresponding to the first time window based on the first user data; a second determination module 300 for determining second data and the second time information corresponding to the second time window based on the second user data; a third determination module 400 for, determining alignment data corresponding to the same user from the first user data and the first user data based on the second data and the second data.

In some embodiments, the first determination module comprises: a first acquisition sub-module for based on a current data processing position, acquiring data corresponding to the first time window from the first user data; a first determination sub-module for determining data time information based on data corresponding to the first time window; a second determination sub-module for, in case that the data time information is later than the first time information, determining the data time information as the first time information, and adding the data of the first time window to the first data.

In some embodiments, the first determination module further comprises: a processing sub-module for, in the case where the data time information is earlier than or equal to the first time information, and the first time window is shorter than a preset time window, increasing the first time window by a preset proportion, and triggering the first acquisition sub-module to acquire data corresponding to the first time window from the first user data based on a current data processing position, until the data time information is later than the first time information.

In some embodiments, the apparatus further comprises: a storage module for, after the third determination module determines, based on respective time window data of the first data and the second data, alignment data corresponding to the same user from the first user data and the second user data, storing the data of the second data with timestamp information later than the first time information, and triggering the first determination module to determine first data and the first time information corresponding to the first time window based on the first user data, until all data elements in the first user data or the second user data have been processed.

In some embodiments, the first user data and the second user data are obtained by: on the side of a first provider providing the first user data, verifying features to be verified in first raw data of the first provider according to a predetermined feature verification rule, and identifying the first raw data verified as the first user data; on the side of a second provider providing the second user data, verifying features to be verified in second raw data of the second provider according to a predetermined feature verification rule, and identifying the second raw data verified as the second user data.

In some embodiments, in the first raw data of the first provider providing the first user data and the second raw data of the second provider providing the second user data, if the identification information used for data alignment processing is of a target type, the first user data and the second user data are obtained by: on the side of the first provider providing the first user data, performing offline encryption hash processing on the identification information of the first raw data based on a first cryptographic key to obtain the first user data; on the side of the second provider providing the second user data, performing a noise addition process on the identification information of the second raw data based on a second cryptographic key and noise information to obtain noise-added data, and sending the noise-added data to the first provider; after receiving the encrypted data obtained by encrypting the noise-added data based on the first cryptographic key from the first provider, performing a denoising process on the encrypted data based on the noise information, and hashing the denoised data to obtain the second user data, wherein the first cryptographic key and the second cryptographic key correspond to a public key and a private key used in asymmetric encryption, respectively.

Figure 5:
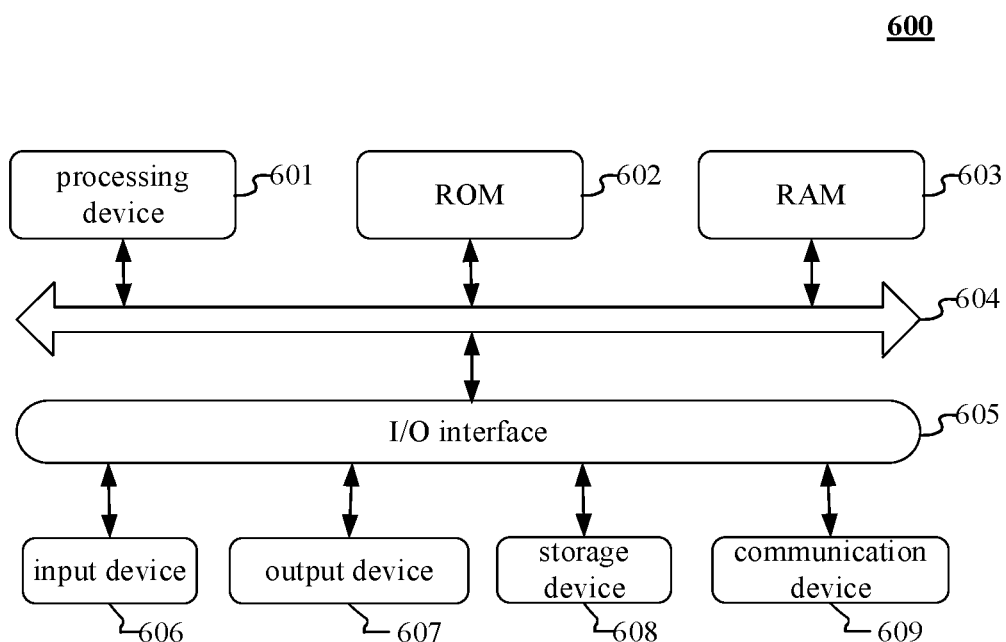
FIG. 5 is a schematic diagram illustrating the structure of an electronic device suitable for implementing the present disclosed embodiments.

Referring now to FIG. 5, a structural diagram of an electronic device 600 suitable for implementing embodiments of the present disclosure is shown. The terminal device of the embodiments of the present disclosure includes, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), and a fixed terminal such as a digital TV, a desktop computer, and the like. The electronic device shown in FIG. 5 is merely an example and should not impose any limitation on the function and scope of the embodiments of the present disclosure.

As shown in FIG. 5, the electronic device 600 includes a processing device (e.g., a central processing unit, a graphics processor) 601, which performs various appropriate actions and processes according to a program stored in Read Only Memory (ROM) 602 or a program loaded from storage device 608 into Random Access Memory (RAM) 603. In RAM 603, various programs and data required for the operation of the electronic device 600 are also stored. Processing device 601, ROM 602 and RAM 603 are connected to each other through bus 604. An input/output (I/O) interface 605 is also connected to the bus 604.

Generally, the following devices can be connected to I/O interface 605: input devices 606 including, for example, a touch screen, a touch pad, a keyboard, a mouse, a camera, a microphone, an accelerometer, a gyroscope, etc; output devices 607 including a liquid crystal display (LCD), a speaker, a vibrator, etc.; a storage device 608 such as a magnetic tape, a hard disk, etc; and a communication device 609. The communication device 609 enables the electronic device 600 to communicate wirelessly or wirelessly with other devices to exchange data. Although FIG. 5 shows the electronic device 600 with various components, it should be understood that it is not required to implement or have all of these components. Alternatively, more or fewer components can be implemented or provided.

In particular, according to some embodiments of the present disclosure, the processes described above with reference to the flowchart can be implemented as a computer software program. For example, some embodiments of the present disclosure includes a computer program product, which includes a computer program carried on a non-transitory computer readable medium, and containing program code for executing the method shown in the flowchart. In such some embodiments, the computer program is downloaded and installed from the network through the communication device 609, or installed from the storage device 608, or from the ROM 602. When the computer program is executed by the processing device 601, the above functions defined in the method of the embodiments of the present disclosure are performed.

It should be noted that the computer-readable medium in the present disclosure is a computer-readable signal medium or a computer-readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium includes, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium can be any tangible medium that can contain or store a program, which can be used by or in connection with an instruction execution system, apparatus or device. In the present disclosure, a computer readable signal medium includes a data signal that is propagated in the baseband or as part of a carrier, carrying computer readable program code. Such propagated data signals can take a variety of forms including, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, including but not limited to wire, fiber optic cable, RF (radio frequency), etc., or any suitable combination of the foregoing.

In some embodiments, a client and a server can communicate using any currently known or future developed network protocol such as HTTP (HyperText Transfer Protocol), and can be interconnected by any form or medium of digital data communication, e.g., a communication network. Examples of communication networks include a local area network ("LAN") and a wide area network ("WAN"), the Internet, and end-to-end networks (for example, ad hoc end-to-end networks), as well as any currently known or future developed networks.

The above computer-readable medium is included in the electronic device described above; or it exists alone without being assembled into the electronic device.

The computer-readable medium carries one or more programs that cause, when executed by the electronic device, the electronic device to perform operations of: acquiring first user data and second user data, and initializing a first time window corresponding to the first user data and first time information corresponding to the first time window, as well as a second time window corresponding to the second user data and second time information corresponding to the second time window; determining first data and the first time information corresponding to the first time window based on the first user data; determining second data and the second time information corresponding to the second time window based on the second user data; based on the first data and the second data, determining alignment data corresponding to the same user from the first user data and the second user data.

The computer program code for executing operations of the present disclosure is complied by any combination of one or more program design languages, the program design languages including object-oriented program design languages, such as Java, Smalltalk, C++, etc, as well as conventional procedural program design languages, such as "C" program design language or similar program design language. A program code is completely or partly executed on a user computer, or executed as an independent software package, partly executed on the user computer and partly executed on a remote computer, or completely executed on a remote computer or server. In the latter circumstance, the remote computer is connected to the user computer through various kinds of networks, including local area network (LAN) or wide area network (WAN), or connected to external computer (for example, through an Internet connection provided by an Internet service provider).

The flowcharts and block diagrams in the different depicted embodiments illustrate the architecture, functionality, and operation of some possible implementations of apparatus, methods and computer program products. In this regard, each block in the flowchart or block diagrams represents a module, segment, or portion of code, which comprises one or more executable instructions for implementing the specified function or functions. It should also be noted that, in some alternative implementations, the functions noted in the block occur out of the order noted in the figures. For example, two blocks shown in succession are executed substantially concurrently, or the blocks sometimes are executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The modules involved in the embodiments described in the present disclosure can be implemented in software or hardware. Wherein the name of a module does not constitute a limitation of the module itself under certain circumstances, for example, the acquisition module is also described as "a module for acquiring first user data and second user data, and initializing a first time window corresponding to the first user data and first time information corresponding to the first time window, as well as a second time window corresponding to the second user data and second time information corresponding to the second time window".

The functions described above are performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium is a tangible medium, which contains or store a program for use by or in connection with an instruction execution system, apparatus, or device. The machine-readable medium is a machine-readable signal medium or a machine-readable storage medium. The machine-readable medium includes, but is not limited to, an electronic, magnetic, optical, electromagnetic, infrared, or semiconductor system, apparatus, or device, or any suitable combination of thereof. More specific examples of the machine-readable storage medium include electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

According to one or more embodiments of the present disclosure, Example 1 provides a data processing method, comprising: acquiring first user data and second user data, and initializing a first time window corresponding to the first user data and first time information corresponding to the first time window, as well as a second time window corresponding to the second user data and second time information corresponding to the second time window; determining first data and the first time information corresponding to the first time window based on the first user data; determining second data and the second time information corresponding to the second time window based on the second user data; based on the first data and the second data, determining alignment data corresponding to the same user from the first user data and the second user data.

According to one or more embodiments of the present disclosure, Example 2 provides the method of Example 1, wherein the determining second data and the second time information corresponding to the second time window based on the second user data comprises: in the case where the second time information is earlier than or equal to the first time information, determining the second data and the second time information corresponding to the second time window based on the second user data.

According to one or more embodiments of the present disclosure, Example 3 provides the method of Example 1, wherein determining first data and the first time information corresponding to the first time window based on the first user data comprises: based on a current data processing position, acquiring data corresponding to the first time window from the first user data; determining data time information based on the data corresponding to the first time window; if the data time information is later than the first time information, determining the data time information as the first time information, and adding the data corresponding to the first time window to the first data.

According to one or more embodiments of the present disclosure, Example 4 provides the method of Example 3, wherein the determining first data and the first time information corresponding to the first time window based on the first user data further comprises: in the case where the data time information is earlier than or equal to the first time information, and the first time window is shorter than a preset time window, increasing the first time window by a preset proportion, and returning to the step of obtaining data corresponding to the first time window from the first user data based on the current data processing position, until the data time information is later than the first time information.

According to one or more embodiments of the present disclosure, Example 5 provides the method of Example 1, wherein after determining alignment data corresponding to the same user from the first user data and the second user data based on the first data and the second data, the method further comprises: storing data of the second data with timestamp information later than the first time information, and returning to the step of determining first data and the first time information corresponding to the first time window based on the first user data, until all data in the first user data or the second user data have been processed.

According to one or more embodiments of the present disclosure, Example 6 provides the method of Example 1, wherein the first user data and the second user data are obtained by: on a side of a first provider providing the first user data, verifying features to be verified in first raw data of the first provider according to a predetermined feature verification rule, and determining the first raw data verified as the first user data;

on a side of a second provider providing the second user data, verifying features to be verified in second raw data of the second provider according to a predetermined feature verification rule, and determining the second raw data verified as the second user data.

According to one or more embodiments of the present disclosure, Example 7 provides the method of Example 1, wherein in the first raw data of the first provider providing the first user data and the second raw data of the second provider providing the second user data, in case that the identification information used for data alignment processing is of a target type, the first user data and the second user data are obtained by: on the side of the first provider providing the first user data, performing offline encryption hash processing on the identification information of the first raw data based on a first cryptographic key to obtain the first user data; on the side of the second provider providing the second user data, performing a noise addition process on the identification information of the second raw data based on a second cryptographic key and noise information to obtain noise-added data, and sending the noise-added data to the first provider; after receiving encrypted data obtained by encrypting the noise-added data based on the first cryptographic key from the first provider, performing a denoising process on the encrypted data based on the noise information, and hashing the denoised data to obtain the second user data, wherein the first cryptographic key and the second cryptographic key correspond to a public key and a private key used in asymmetric encryption, respectively.

According to one or more embodiments of the present disclosure, Example 8 provides a data processing apparatus, comprising: an acquisition module for acquiring first user data and second user data, and initializing a first time window corresponding to the first user data and first time information corresponding to the first time window, as well as a second time window corresponding to the second user data and second time information corresponding to the second time window; a first determination module for determining first data and the first time information corresponding to the first time window based on the first user data; a second determination module for determining second data and the second time information corresponding to the second time window based on the second user data; a third determination module for based on the first data and the second data, determining alignment data corresponding to the same user from the first user data and the second user data.

According to one or more embodiments of the present disclosure, Example 9 provides a computer-readable storage medium stored thereon a computer program that, when executed by a processing device, carries out the steps of the data processing method described in any one of Example 1 to Example 7.

According to one or more embodiments of the present disclosure, Example 10 provides an electronic device, comprising: a storage device having stored thereon a computer program; a processing device for executing the computer program in the storage device to implement the steps of the data processing method described in any one of Example 1 to Example 7.

The above description is only preferred embodiments of the present disclosure and an explanation of the applied technical principles. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the disclosed concept, for example, technical solutions formed by replacing the above features with technical features having similar functions to (but not limited to) those disclosed in the present disclosure.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims. For the apparatus described in the above embodiments, the specific ways in which the various modules of the apparatus operate have been described in detail in the embodiments of the relevant method, and will not be explained in detail here.

What is claimed is:

1. A data processing method, comprising:
   acquiring first user data and second user data, and initializing a first time window corresponding to the first user data and first time information corresponding to the first time window, as well as a second time window corresponding to the second user data and second time information corresponding to the second time window;
   determining first data and the first time information corresponding to the first time window based on the first user data;
   determining second data and the second time information corresponding to the second time window based on the second user data; and
   determining alignment data corresponding to a same user from the first user data and the second user data based on the first data and the second data, wherein
   the determining first data and the first time information corresponding to the first time window based on the first user data comprises:
     acquiring data corresponding to the first time window from the first user data based on a current data processing position;
     determining data time information based on data corresponding to the first time window;
     in case that the data time information is later than the first time information, determining the data time information as the first time information, and adding the data corresponding to the first time window to the first data; and
     in case that the data time information is earlier than or equal to the first time information, and the first time window is shorter than a preset time window, increasing the first time window by a preset proportion, and returning to the obtaining the data corresponding to the first time window from the first user data based on the current data processing position, until the data time information is later than the first time information.

2. The data processing method according to claim 1, wherein the determining second data and the second time information corresponding to the second time window based on the second user data comprises:
   in case that the second time information is earlier than or equal to the first time information, determining the second data and the second time information corresponding to the second time window based on the second user data.

3. The data processing method according to claim 1, wherein after determining alignment data corresponding to a same user from the first user data and the second user data based on the first data and the second data, the data processing method further comprises:
   storing data of the second data with timestamp information later than the first time information, and returning to the determining first data and the first time information corresponding to the first time window based on the first user data, until all data in the first user data or the second user data have been processed.

4. The data processing method according to claim 1, wherein the first user data and the second user data are obtained by:
   on a side of a first provider providing the first user data, verifying features to be verified in first raw data of the first provider based on a predetermined feature verification rule, and determining the first raw data verified as the first user data; and
   on a side of a second provider providing the second user data, verifying features to be verified in second raw data of the second provider based on a predetermined feature verification rule, and determining the second raw data verified as the second user data.

5. The data processing method according to claim 1, wherein in the first raw data of the first provider providing the first user data and the second raw data of the second provider providing the second user data, in case that identification information used for data alignment processing is of a target type, the first user data and the second user data are obtained by:
   on a side of the first provider providing the first user data, performing offline encryption hash processing on the identification information of the first raw data based on a first cryptographic key to obtain the first user data; and
   on a side of the second provider providing the second user data, performing noise addition processing on the identification information of the second raw data based on a second cryptographic key and noise information to obtain noise-added data, and sending the noise-added data to the first provider, and after receiving encrypted data obtained by performing encryption processing on the noise-added data based on the first cryptographic key from the first provider, performing denoising processing on the encrypted data based on the noise information, and performing a hash processing on the denoised data to obtain the second user data, wherein the first cryptographic key correspond to a private key and the second cryptographic key correspond to a public key used in asymmetric encryption.

6. The data processing method according to claim 1, wherein the first time window and the second time window are initialized to a same length.

7. The data processing method according to claim 1, wherein data alignment is performed based on identification information in the first data and the second data.

8. The data processing method according to claim 1, wherein the identification information is a same primary key corresponding to the data in the first data and the second data.

9. A non-transitory computer-readable storage medium stored thereon a computer program instructions that, when executed by a processing device, executes the data processing method comprising:
   acquiring first user data and second user data, and initializing a first time window corresponding to the first user data and first time information corresponding to the first time window, as well as a second time window corresponding to the second user data and second time information corresponding to the second time window;

determining first data and the first time information corresponding to the first time window based on the first user data;

determining second data and the second time information corresponding to the second time window based on the second user data; and determining alignment data corresponding to a same user from the first user data and the second user data based on the first data and the second data, wherein the determining first data and the first time information corresponding to the first time window based on the first user data comprises:

acquiring data corresponding to the first time window from the first user data based on a current data processing position;

determining data time information based on data corresponding to the first time window;

in case that the data time information is later than the first time information, determining the data time information as the first time information, and adding the data corresponding to the first time window to the first data; and in case that the data time information is earlier than or equal to the first time information, and the first time window is shorter than a preset time window, increasing the first time window by a preset proportion, and returning to the obtaining the data corresponding to the first time window from the first user data based on the current data processing position, until the data time information is later than the first time information.

10. An electronic device, comprising:

a storage device having stored thereon a computer program instructions;

a processing device for executing the computer program instructions in the storage device to implement the data processing method comprising:

acquiring first user data and second user data, and initializing a first time window corresponding to the first user data and first time information corresponding to the first time window, as well as a second time window corresponding to the second user data and second time information corresponding to the second time window;

determining first data and the first time information corresponding to the first time window based on the first user data;

determining second data and the second time information corresponding to the second time window based on the second user data; and determining alignment data corresponding to a same user from the first user data and the second user data based on the first data and the second data, wherein the determining first data and the first time information corresponding to the first time window based on the first user data comprises:

acquiring data corresponding to the first time window from the first user data based on a current data processing position;

determining data time information based on data corresponding to the first time window;

in case that the data time information is later than the first time information, determining the data time information as the first time information, and adding the data corresponding to the first time window to the first data; and in case that the data time information is earlier than or equal to the first time information, and the first time window is shorter than a preset time window, increasing the first time window by a preset proportion, and returning to the obtaining the data corresponding to the first time window from the first user data based on the current data processing position, until the data time information is later than the first time information.

11. The non-transitory computer-readable storage medium according to claim 9, wherein the data processing method further comprising:

in case that the second time information is earlier than or equal to the first time information, determining the second data and the second time information corresponding to the second time window based on the second user data.

12. The non-transitory computer-readable storage medium according to claim 9, wherein the data processing method further comprises:

after determining alignment data corresponding to a same user from the first user data and the second user data based on the first data and the second data, storing data of the second data with timestamp information later than the first time information, and returning to the determining first data and the first time information corresponding to the first time window based on the first user data, until all data in the first user data or the second user data have been processed.

13. The electronic device according to claim 10, wherein the data processing method further comprising:

in case that the second time information is earlier than or equal to the first time information, determining the second data and the second time information corresponding to the second time window based on the second user data.

14. The electronic device according to claim 10, wherein the data processing method further comprises:

after determining alignment data corresponding to a same user from the first user data and the second user data based on the first data and the second data, storing data of the second data with timestamp information later than the first time information, and returning to the determining first data and the first time information corresponding to the first time window based on the first user data, until all data in the first user data or the second user data have been processed.

* * * * *